(12) United States Patent
Nikiforuk

(10) Patent No.: US 9,127,514 B2
(45) Date of Patent: Sep. 8, 2015

(54) BLADDER TYPE CRIMPER

(71) Applicant: TESCO CORPORATION, Houston, TX (US)

(72) Inventor: Kevin James Nikiforuk, Houston, TX (US)

(73) Assignee: TESCO CORPORATION, Houston, TX (US)

(*) Notice: Subject to any disclaimer, the term of this patent is extended or adjusted under 35 U.S.C. 154(b) by 451 days.

(21) Appl. No.: 13/710,050

(22) Filed: Dec. 10, 2012

(65) Prior Publication Data

US 2014/0158372 A1 Jun. 12, 2014

(51) Int. Cl.
*E21B 17/12* (2006.01)
*B30B 5/02* (2006.01)
*E21B 17/10* (2006.01)
*B21D 39/04* (2006.01)
*F16L 13/14* (2006.01)

(52) U.S. Cl.
CPC .......... *E21B 17/1078* (2013.01); *B21D 39/048* (2013.01); *B30B 5/02* (2013.01); *E21B 17/1014* (2013.01); *E21B 17/12* (2013.01); *F16L 13/141* (2013.01); *F16L 2013/145* (2013.01)

(58) Field of Classification Search
CPC ......... E21B 17/08; E21B 12/00; E21B 19/16; E21B 17/1078; E21B 17/1085; B30B 1/003; B30B 5/02; B30B 11/001; F16L 13/141; F16L 2013/145; B21D 39/048
See application file for complete search history.

(56) References Cited

U.S. PATENT DOCUMENTS

| | | | | |
|---|---|---|---|---|
| 2,838,796 A | * | 6/1958 | Reed | 264/280 |
| 3,269,157 A | * | 8/1966 | Ashley | 68/242 |
| 3,429,587 A | * | 2/1969 | Kish | 285/18 |
| 4,187,776 A | * | 2/1980 | Schroder | 100/325 |
| 4,370,120 A | * | 1/1983 | Foster et al. | 425/405.2 |
| 4,651,638 A | * | 3/1987 | Duchamp et al. | 100/211 |
| 4,888,144 A | * | 12/1989 | Matsushita et al. | 264/120 |
| 4,937,025 A | * | 6/1990 | Foster et al. | 264/120 |
| 4,997,511 A | * | 3/1991 | Newsom | 156/382 |
| 5,490,969 A | * | 2/1996 | Bewlay et al. | 419/68 |
| 5,693,175 A | * | 12/1997 | Jarrett | 156/382 |
| 5,746,764 A | * | 5/1998 | Green et al. | 606/194 |
| 5,810,838 A | * | 9/1998 | Solar | 606/108 |
| 5,860,966 A | * | 1/1999 | Tower | 606/1 |
| 5,971,992 A | * | 10/1999 | Solar | 606/108 |
| 5,972,028 A | * | 10/1999 | Rabenau et al. | 623/1.11 |
| 6,745,445 B2 | * | 6/2004 | Spilka | 29/407.08 |
| 7,690,237 B2 | | 4/2010 | Slack | |
| 2001/0006109 A1 | * | 7/2001 | Michael Victor Kaiser et al. | 166/285 |
| 2003/0019637 A1 | * | 1/2003 | Slack et al. | 166/380 |
| 2004/0078953 A1 | * | 4/2004 | Spilka | 29/505 |

* cited by examiner

*Primary Examiner* — Blake Michener
(74) *Attorney, Agent, or Firm* — Fletcher Yoder, PC

(57) ABSTRACT

Embodiments of the present disclosure are directed toward a bladder-type crimper. The crimper includes a cylindrical body comprising a cavity and a bladder assembly disposed within the cavity, wherein the bladder assembly comprises an elastic bladder and a plurality of fingers arrayed about opposite ends of the elastic bladder, wherein the cylindrical body and the bladder assembly are configured to be disposed about a tubular.

20 Claims, 3 Drawing Sheets

BLADDER TYPE CRIMPER

FIELD OF DISCLOSURE

The present disclosure relates generally to the field of well drilling operations. More specifically, embodiments of the present disclosure relate to the use of a bladder-type crimper for connecting a centralizer or other component to casing or tubing in a down-hole environment.

BACKGROUND

In conventional oil and gas operations, a well is typically drilled to a desired depth with a drill string, which includes drill pipe and a drilling bottom hole assembly (BHA). Once the desired depth is reached, the drill string is removed from the hole and casing is run into the vacant hole. In some conventional operations, the casing may be installed as part of the drilling process. A technique that involves running casing at the same time the well is being drilled may be referred to as "casing-while-drilling."

Casing may be defined as pipe or tubular that is placed in a well to prevent the well from caving in, to contain fluids, and/or to assist with efficient extraction of product. When the casing is properly positioned within a hole or well, the casing is typically cemented in place by pumping cement through the casing and into an annulus formed between the casing and the hole (e.g., a wellbore or parent casing). Once a casing string has been positioned and cemented in place or installed, the process may be repeated via the now installed casing string. For example, the well may be drilled further by passing a drilling BHA through the installed casing string and drilling. Further, additional casing strings may be subsequently passed through the installed casing string (during or after drilling) for installation. Indeed, numerous levels of casing may be employed in a well. For example, once a first string of casing is in place, the well may be drilled further and another string of casing (an inner string of casing) with an outside diameter that is accommodated by the inside diameter of the previously installed casing may be run through the existing casing. Additional strings of casing may be added in this manner such that numerous concentric strings of casing are positioned in the well, and such that each inner string of casing extends deeper than the previously installed casing or parent casing string.

Liner may also be employed in some drilling operations. Liner may be defined as a string of pipe or tubular that is used to case open hole below existing casing or liner. Casing is generally considered to extend all the way back to a wellhead assembly at the surface. In contrast, a liner merely extends a certain distance (e.g., 30 meters) into the previously installed casing or parent casing string. However, a tieback string of casing may be installed that extends from the wellhead downward into engagement with previously installed liner. The liner is typically secured to the parent tubular by a liner hanger that is coupled to the liner and engages with the interior of the upper tubular.

Thus, establishing a down-hole operation, such as may be involved in conventional oil and gas operations, may involve deploying and operating a variety of tubular components (e.g., casing, liner, drill pipe, and so forth) down a tubular wellbore, while the wellbore is being formed or after the wellbore is formed. In certain instances, the tubular elements may be fitted with a component that acts to centralize the tubular elements within the bore, e.g., a centralizer. For example, during a casing drilling operation, a series of centralizers may be fitted to the casing during the drilling operation to keep the casing centered within the bore. For example, the centralizers may be fitted at the joints where casing segments are joined (such as every 30 feet) or at other periodic distances to insure that the casing remains centered in the bore.

BRIEF DESCRIPTION

In accordance with one embodiment, a crimper includes a ring-shaped body having a cavity and a bladder assembly disposed within the cavity, wherein the bladder assembly comprises an elastic bladder and a plurality of fingers arrayed about opposite ends of the elastic bladder, wherein the ring-shaped body and the bladder assembly are configured to be disposed about a tubular.

In accordance with a second embodiment, a system includes a cylindrical body having a cavity, a port extending from an exterior of the cylindrical body to the cavity, and end caps removably coupled to opposite ends of the cylindrical body. The system further includes a bladder assembly disposed within the cavity of the cylindrical body, where the bladder assembly includes a cylindrical bladder, a first plurality of fingers arrayed about a first end of the cylindrical bladder, and a second plurality of fingers arrayed about a second end of the cylindrical bladder, wherein the cylindrical body and the bladder assembly are configured to be disposed about a tubular, and the bladder assembly is configured to abut the tubular.

In accordance with a third embodiment, a method includes positioning a crimper about a tubular accessory to be secured to a tubular, pumping a fluid in a cavity of a crimper body, applying a radially inward force to the tubular accessory with a plurality of fingers of a bladder assembly disposed within the cavity of the crimper body, draining the fluid from the cavity, and removing the crimper from the tubular accessory.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The present disclosure relates generally to the attachment of a centralizer (or other accessory) to a down-hole component, such as a casing, liner, or drill pipe. Embodiments of the present disclosure are directed to providing and using a bladder-type crimper for attachment of a centralizer or other accessory to a tubular component. For example, the bladder-type crimper may include an annular or cylindrical body that encloses a bladder having steel inserts or fingers disposed about an end of a centralizer or other accessory positioned about a casing or liner. The annular body further includes a port through which a fluid, such as hydraulic fluid, may be pumped into a cavity of the annular body. As fluid is pumped into the annular body, the fluid stretches and expands the bladder and the steel inserts or fingers. In the manner described below, the steel inserts or fingers of the bladder are forced radially inward into the end of the centralizer or accessory, thereby pressing the end of the centralizer or accessory into the casing or liner. As the pressure within the annular body increases, the force applied by the steel inserts to the end of the centralizer or accessory may exceed a "crush" value of the centralizer or accessory and the casing or liner. As the crush values of centralizer or accessory and the casing or liner are exceeded, the centralizer or accessory may be crimped or coupled to the casing or liner.

Figure 1:
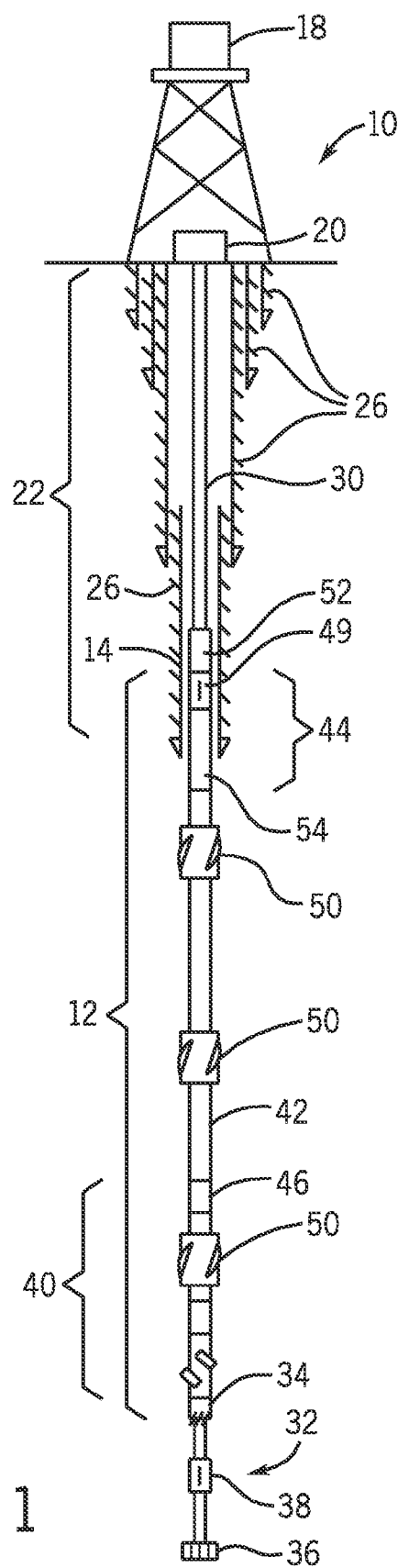
FIG. 1 is a schematic representation of a well being drilled, in accordance with aspects of the present disclosure.

With the foregoing in mind, and turning to the figures, FIG. 1 is a schematic representation of a well 10 that is being drilled using a casing-while-drilling technique, wherein a liner string 12 is about to be hung within a previously installed liner 14 that was cemented into the well 10. In other embodiments, different drilling techniques may be employed. The well 10 includes a derrick 18, wellhead equipment 20, and several levels of casing 22 (e.g., conductor pipe, surface pipe, intermediate string, and so forth), which includes the previously installed liner 14, which may be casing in some embodiments. The casing 22 and the liner 14 have been cemented into the well 10 with cement 26. Further, as illustrated in FIG. 1, the liner string 12 is in the process of being hung from the previously installed liner 14, which may be referred to as the parent liner 14.

While other embodiments may utilize different drilling techniques, as indicated above, the well 10 is being drilled using a casing-while-drilling technique. Specifically, the liner string 12 is being run as part of the drilling process. In the illustrated embodiment, a drill pipe 30 is coupled with the liner string 12 and a drilling BHA 32. The drilling BHA 32 is also coupled with an upper portion of the liner string 12 and extends through the liner string 12 such that certain features of the drilling BHA 32 extend out of the bottom of the liner string 12. Indeed, an upper portion of the drilling BHA 32 is disposed within the inside diameter of the liner string 12, while a lower portion of the drilling BHA 32 extends out of a liner shoe 34 at the bottom of the liner string 12. Specifically, in the illustrated embodiment, a drill bit 36 and an under reamer 38 of the drilling BHA 32 extend out from the liner string 12. Thus, the drilling BHA 32 is positioned to initiate and guide the drilling process.

The liner string 12 includes a shoe track 40, a string of tubing 42, and a liner top assembly 44. The shoe track 40 defines the bottom of the liner string 12 and includes the liner shoe 34 to facilitate guiding the liner string 12 through the wellbore. In the illustrated embodiment, the shoe track 40 also includes an indicator landing sub 46 to facilitate proper engagement with the drilling BHA 32, and various other features, such as a pump down displacement plug (PDDP). The string of tubing 42 is essentially the main body of the liner string 12 that connects the shoe track 40 with the liner top assembly 44. The liner top assembly 44, which defines the top of the liner string 12, includes a liner hanger 49 that is capable of being activated and/or deactivated by a liner hanger control tool 52. The liner top assembly 44 may also include a liner drill lock section 54, which includes a liner drill lock that facilitates engagement/disengagement of the drill string 30 from the liner string 12. The liner drill lock may be actuated by external or internal components affixed to or part of a body of the liner hanger 49.

Once a desired depth is reached, the liner string 12 may be hung or set down to facilitate detachment of the drilling BHA 32. As illustrated in FIG. 1, the liner string 12 may be hung from the parent liner 14, and the drilling BHA 32 may be detached from the liner string 12 and pulled out of the well 10 with the drill string 30 and an inner string (not shown). In order to hang the liner string 12 from the parent liner 14, the hanger 49 may be activated with the liner hanger control tool 52. In some embodiments, the hanger 49 is not utilized and the liner string 12 is set on bottom.

The casing and liner strings (e.g., the casing 22, the parent liner 14, and the liner string 12) are run into the well 10 using a running tool. As used herein, the terms "casing", "liner", and other such components may be generally referred to as "tubular." As will be appreciated from this discussion, a wide array of tubular elements (e.g., casing, liner, drill pipe, and so forth) may be positioned within the wellbore. For example, in the above described implementation of casing-while-drilling, casing 22 or liner string 12 may be positioned in the well bore as part of the drilling or deployment operation. For instance, in one type of implementation, the casing 22 may consist of 30 foot segments of a suitable diameter (e.g., 13⅜ inches) that are joined as the casing 22 is deployed down the wellbore. However, in other implementations, length of the casing segments and/or the diameter of the casing 22 may be any suitable length or diameter.

Figure 2:
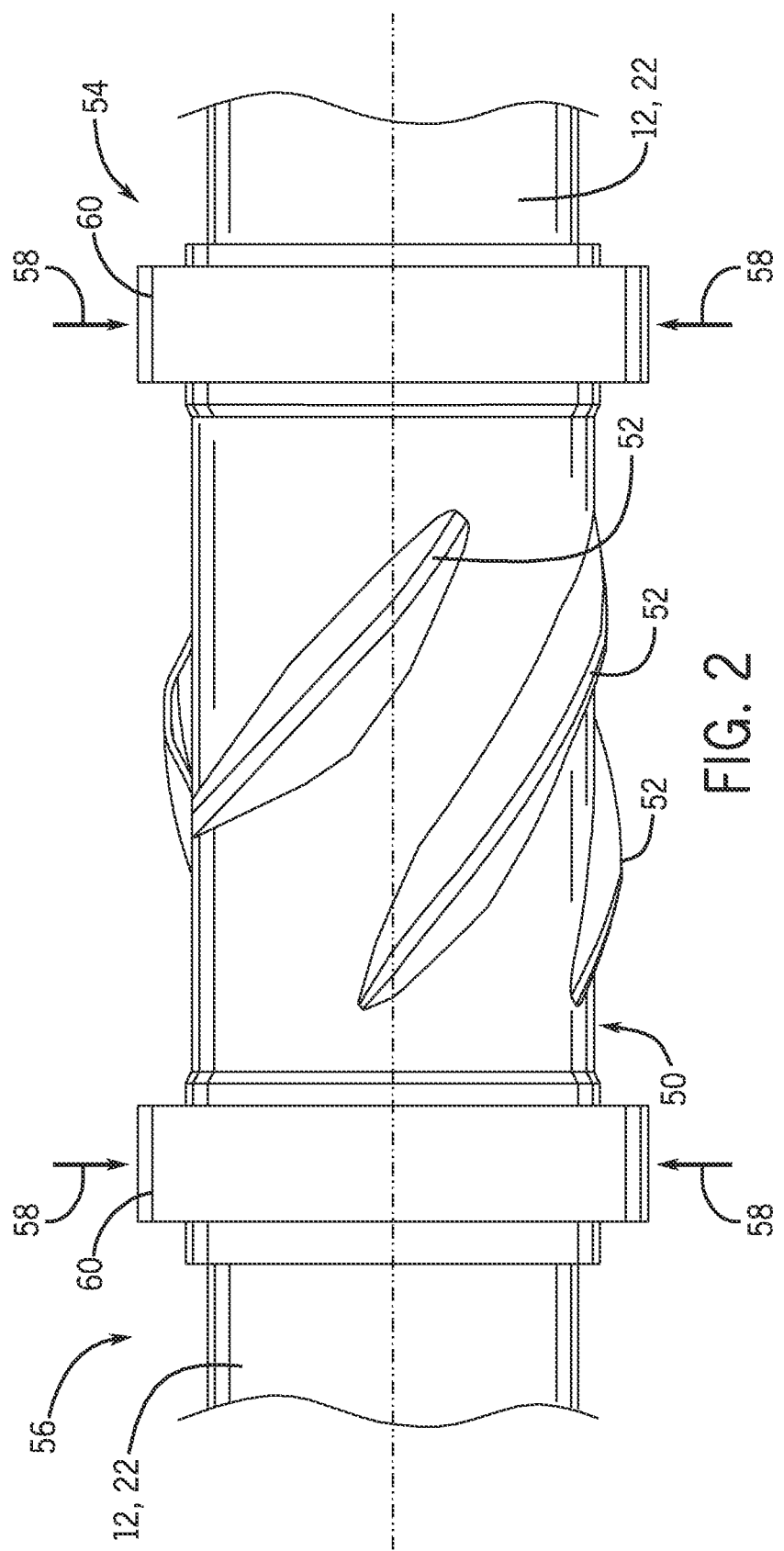
FIG. 2 is a side view of a centralizer attached to a casing or liner, in accordance with aspects of the present disclosure.

As discussed herein, some of the various tubular elements, such as the casing 22, may be coupled with one or more centralizing elements (e.g., centralizers 50) or other accessories attached using techniques in accordance with the present disclosure. Centralizing elements generally keep tubular elements centered within the wellbore when deployed and operated (e.g., rotated). Turning to FIG. 2, one example of a centralizer 50 disposed about the casing 22 or liner string 12 is shown. In this example, the centralizer 50 has raised features 52 disposed circumferentially about the centralizer 50. During operation, these raised features 52 of the centralizer 50 act to keep the casing 22 or liner string 12 centered within the wellbore. In one implementation, the walls of the centralizer 50 are ½ inch thick, though in other implementations the walls of the centralizer 50 may be any suitable thickness. In addition, the centralizer 50 includes a first end 54 and a second end 56 that may each be attached to the casing 22 or liner string 12 with a bladder-type crimper 60. That is, the first end 54 and the second end 56 may be crimped radially inward by the bladder-type crimper 60, thereby securing the centralizer 50 to the casing 22 or liner string 12. More specifically, when the centralizer 50 is in position to be secured to the casing 22 or liner string 12, one bladder-type crimper 60 is positioned about the first end 54 of the centralizer 50, and another bladder-type crimper 60 is positioned about the second end 56 of the centralizer 50. In the manner described below, the bladder-type crimpers 60 are used to press the first and second ends 54 and 56 of the centralizer radially inward, as indicated by arrows 58, thereby crimping the centralizer 50 to the casing 22 or liner string 12.

While the preceding discussion has generally related to the application of the centralizer 50 to the casing 22 or liner 12 using bladder-type crimpers 60, it should be appreciated that this implementation has been provided by way of example only, and is not intended to limit the scope of the present disclosure. That is, the use of bladder-type crimpers 60 as disclosed herein may be similarly applied to attach other elements or structures to a tubular element. For example, bladder-type crimpers 60 as disclosed herein may be used to apply wear bands or other accessories to the casing 22 or liner string 12 or to any other suitable tubular element. With the foregoing discussion in mind, it should be appreciated that certain presently described embodiments allow engagement of a structure, such as a centralizer or wear band, to a tubular element, such as the casing 22 or liner string 12 by the use of bladder-type crimpers 60 as discussed herein.

Figure 3:
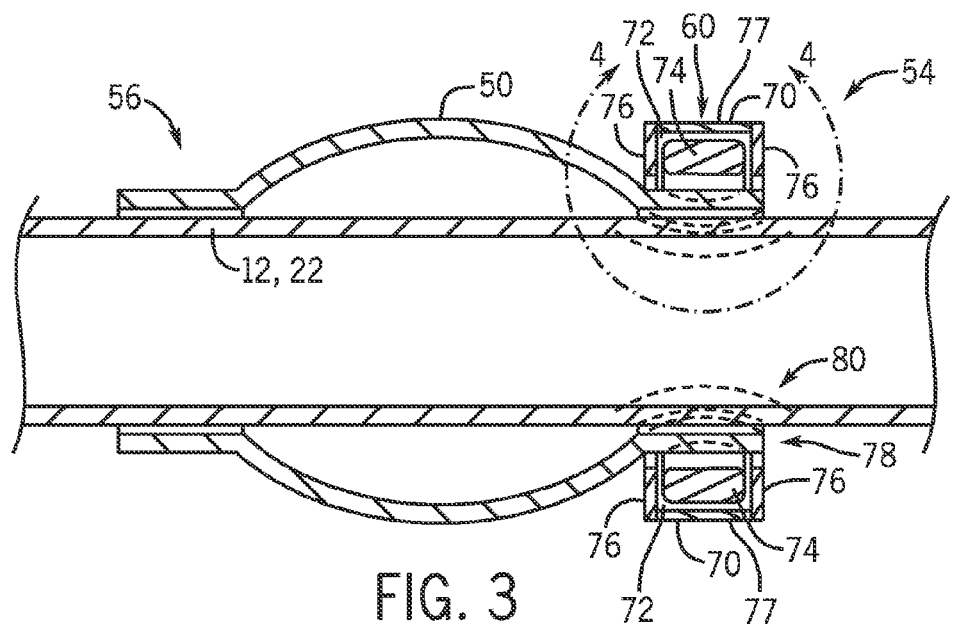
FIG. 3 is a side cross-sectional view of a centralizer attached to a casing or liner, illustrating a bladder-type crimper for attaching the centralizer to the casing or liner, in accordance with aspects of the present disclosure.

FIG. 3 is a side cross-sectional view of an embodiment of the centralizer being attached to the casing 22 or liner string 12 with the bladder-type crimper 60. Specifically, the bladder-type crimper 60 is securing (e.g., crimping) the first end 54 of the centralizer 50 to the casing 22 or liner string 12. As mentioned above, the bladder-type crimper 60 operates to press or force the centralizer 50 (e.g., the first end 54 or the second end 56 of the centralizer 50) radially inward. In particular, the bladder-type crimper 60 applies a radially inward force sufficient to press the centralizer 50 into the casing 22 or liner string 12. In this manner, the bladder-type crimper 60 secures the centralizer 50 to the casing 22 or liner string 12.

In the illustrated embodiment, the bladder-type crimper 60 includes an annular body 70 (e.g., a circular or ring-shaped body), which is positioned about the first end 54 of the centralizer 50. In one embodiment, the annular body 70 may include a single annular, cylindrical, or ring-shaped component, while in other embodiments, the annular body 70 may include multiple components, such as two half-cylinder components that cooperatively form the annular or ring-shaped body. Indeed, the annular body 70 may include any number of components to form the annular body 70. The annular body 70 forms a cavity 72, which houses a bladder assembly 74 (e.g., a cylindrical bladder assembly) that also is positioned about the first end 54 of the centralizer 50. More specifically, the bladder assembly 74 is disposed about and abuts the first end 54 of the centralizer 50. As discussed in detail below, the bladder assembly 74 may include multiple components. The bladder assembly 74 is held within the cavity 72 of the annular body 70 by two end caps 76 and an outer wall 77 of the annular body 70. The annular body 70 is rigid and is configured to prevent extrusion of the bladder assembly 74 in a radially outward or lateral direction. For example, the annular body 70 may be made from steel or other metal. Additionally, the end caps 76 may be secured to the outer wall 77 of the annular body 70 by bolts, screws, threaded plugs, a weld, braze, or other fastener.

As discussed in detail below, when the bladder assembly 74 is expanded within the cavity 72 of the annular body 70, the annular body 70 directs the force of the expanding bladder assembly 74 radially inward. In this manner, the bladder assembly 74 may apply a force to the first end 54 of the centralizer 50. As the force applied by the bladder assembly 74 increases, the force may exceed a "crush" value of the centralizer 50, thereby causing plastic deformation of the centralizer 50. That is, the force applied by the bladder assembly 74 may cause the first end 54 of the centralizer to be deformed radially inward (e.g., toward the casing 22 or liner string 12), as indicated by reference numeral 78. The force applied by the bladder assembly 74 may further exceed a "crush" value of the casing 22 or the liner string 12, thereby causing the casing 22 or liner string 12 to deform radially inward as well, as indicated by reference numeral 80. In this manner, the centralizer 50 may be crimped, and therefore secured, to the casing 22 or liner 12.

Figure 4:
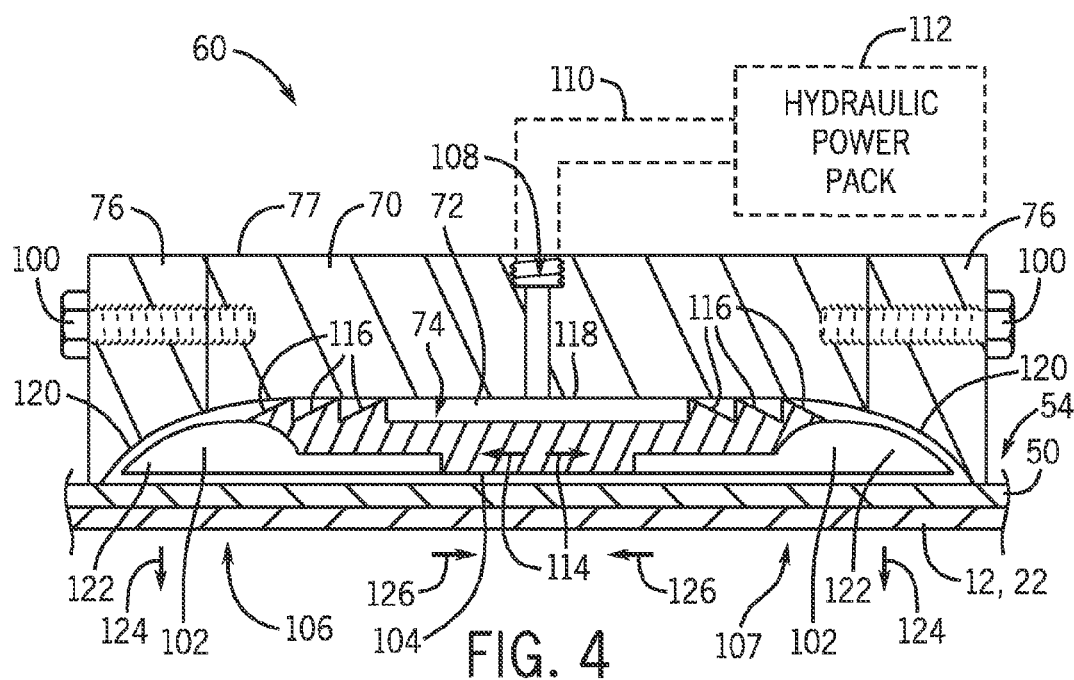
FIG. 4 is a partial side cross-sectional view of a centralizer attached to a casing or liner, illustrating a bladder-type crimper for attaching the centralizer to the casing or liner, in accordance with aspects of the present disclosure.

FIG. 4 is a partial side cross-sectional view of the bladder-type crimper 60 of FIG. 3, taken along line 4-4. As mentioned above, the annular body 70 of the bladder-type crimper 60 encloses the bladder assembly 74 within the cavity 72 formed by the bladder-type crimper 60. In the illustrated embodiment, the end caps 76 are coupled to the outer wall 77 with fasteners 100 to form the annular body 70. The end caps 76 may be removed by removing the fasteners 100, thereby enabling access to the bladder assembly 74 when necessary. As mentioned above, the fasteners 100 may include bolts, screws, threaded plugs, welds, brazes, or other fasteners.

The bladder assembly 74 includes a plurality of fingers 102 cast into an elastic bladder 104 (e.g., a stretchable or expandable component). For example, the elastic bladder 104 may be annular or cylindrical and may be formed from a rubber or other elastomer. The fingers 102 may be formed from steel or other metal and are cast into the elastic bladder 104 on opposite ends 106, 107 of the elastic bladder 104. That is, the fingers 102 are cast in an array about a circumference of the annular elastic bladder 104 at both ends 106, 107 of the elastic bladder 104. In certain embodiments, the fingers 102 may be equidistantly spaced about the elastic bladder 104, and the bladder assembly 74 may include the same number of fingers 102 cast into each end 106 of the elastic bladder 104 (see FIG. 5).

As mentioned above, in operation, the bladder assembly 74 expands and applies a radially inward force on the centralizer 50 and the casing 22 or liner string 12. More specifically, the annular body 70 of the bladder-type crimper 60 has a port 108, to which a fluid line 110 may be attached. For example, the fluid line or hose 110 may route a fluid (e.g., a hydraulic fluid or oil) from a hydraulic power pack 112 into the cavity 72 of the bladder-type crimper 60. The hydraulic power pack 112 may be configured to supply a hydraulic fluid or oil to the bladder-type crimper 60 at an elevated pressure (e.g., 2000, 4000, 6000, 8000, 10000, or more pounds per square inch). As fluid is pumped into the cavity 72 of the bladder-type crimper 60, pressure within the cavity 72 builds. As the pressure within the cavity 72 builds, the elastic bladder 104 may expand and stretch (e.g., axially or laterally in directions 114). Indeed, in the illustrated embodiment, the elastic bladder 104 includes seals 116 which contact an inner surface 118 of the annular body 70. The seals 116 are configured to provide a pressure seal for the fluid entering the cavity 72 of the bladder-type crimper 60. Consequently, the elastic bladder 104 may be further biased in the directions 114 as pressure within the cavity 72 increases. It is important to note that the elastic bladder 104 may not be a hollow component. Rather, the elastic component 104 at least partially forms the cavity 72 within the bladder-type crimper 60 and is configured to expand or stretch as pressure within the cavity 72 builds from hydraulic fluid or oil pumped into the cavity 72.

As the elastic bladder 104 expands axially or laterally outward (e.g., in the directions 114), the fingers 102 of the bladder assembly 74 contact inner surfaces 120 of the end caps 76. As shown, respective distal ends 122 of the fingers 102 have contours which substantially match the respective contours of the inner surfaces 120 of the end caps 76. Specifically, the contours of the distal ends 122 of the fingers 102 and the inner surfaces 120 of the end caps 76 are generally curved or angled. As such, the fingers 102 and the end caps 76 engage with one another as the elastic bladder 104 expands within the cavity 72. More specifically, the curved contours of the distal ends 122 of the fingers 102 and the inner surfaces 120 of the end caps 76 cause the fingers 102 to be directed radially inward (e.g., in a direction 124) as the elastic bladder 104 and the fingers 102 expand axially in the directions 114. In this manner, force from the hydraulic power pack 112 is applied via the fingers 102 as a radially inward force on the centralizer 50. As will be appreciated, the curved contour of the fingers 102 and the inner surfaces 120 of the end caps 76 may also reduce the likelihood of the fingers 102 becoming wedged between the end caps 76 and the centralizer 50. To further reduce wedging between the fingers 102 and the end caps 76, the fingers 102, the end caps 76, and/or the centralizer 50 may have a lubricant applied to their respective surfaces.

As mentioned above, as the pressure within the cavity 72 increases, the force applied to the centralizer 50 by the fingers 102 increases. The force applied by the fingers 102 may increase above a "crush" value of the centralizer 50 and the casing 22 or liner string 12, thereby causing plastic deformation of the centralizer 50 and the casing 22 or liner string 12. In this manner, the centralizer 50 may become crimped and secured to the casing 22 or liner string 12. The amount or degree of crimping (e.g., the amount of plastic deformation experienced by the centralizer 50 and/or the casing 22 or the liner string 12) completed via the bladder 104 may be measured using a variety of methods. For example, a bore gauge may be used to measure an inner diameter of the casing 22 or liner string 12 at the location of the crimp.

After the centralizer 50 is crimped and secured to the casing 22 or liner string 12, the pressure within the cavity 72 of the bladder-type crimper 60 may be released. That is, the fluid (e.g., hydraulic fluid or oil) may be released from the cavity 72 by the hydraulic power pack 112. As the pressure is reduced within the cavity 72, the elastic bladder 104 may contract back to its original state (e.g., in directions 126), thereby decreasing the force applied on the centralizer 50 by the fingers 102. Thereafter, the bladder-type crimper 60 may be removed.

As will be appreciated, the disclosed embodiments may be more lightweight and practical than traditional crimping mechanisms, such as large mechanical crimpers. Additionally, the disclosed bladder-type crimper 60 may include fewer components than traditional crimpers. The various components of the bladder-type crimper 60 (e.g., annular body 70 and bladder assembly 74) may also be more inexpensive to manufacture and replace.

Figure 5:
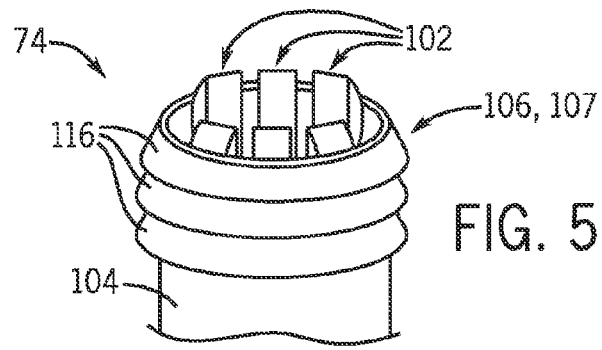
FIG. 5 is a perspective view of the bladder assembly, illustrating one end of the bladder assembly.

FIG. 5 is a perspective view of the bladder assembly 74, illustrating one end 106, 107 of the bladder assembly 74. As described in detail above, the bladder assembly 74 is a cylindrical assembly that is disposed about the first end 54 or the second end 56 of the centralizer 50 or other tubular accessory. Additionally, the bladder assembly 74 is enclosed by or housed within the annular body 70 of the bladder-type crimper 60. That is the annular body 70 is disposed about the bladder assembly 74 when the bladder-type crimper 60 is positioned about the centralizer 50 or other tubular accessory. As discussed above, the fingers 102 of the bladder assembly 74 may be formed from steel or other metal and are cast into the elastic bladder 104 (e.g., along an interior surface of the elastic bladder 104) on opposite ends 106, 107 of the elastic bladder 104. Similarly, as shown in the illustrated embodiment, the fingers 102 are equidistantly spaced about a circumference of the elastic bladder 104. As mentioned above, any suitable number of fingers 102 may be cast into the elastic bladder 104 at each end 106, 107.

As discussed in detail above, the disclosed embodiments are directed generally to the attachment of the centralizer 50 (or other accessory) to a down-hole component, such as the casing 22 or liner string 12, with the bladder-type crimper 60. In certain embodiments, the bladder-type crimper 60 includes the annular body 70 that encloses the bladder assembly 74, which includes the elastic bladder 104 with fingers 102. During use, the bladder-type crimper 60 is disposed about an end (e.g., the first or second end 54 or 56) of the centralizer 50 or other accessory positioned about the casing 22 or liner strong 12. The annular body 70 further includes the port 108 through which a fluid, such as hydraulic fluid or oil, may be pumped into the cavity 72 of the annular body 70. As fluid is pumped into the annular body 70, the fluid stretches and expands the elastic bladder 104 and the fingers 102. In this manner, the fingers 102 of the bladder assembly 74 are forced radially inward into the end (e.g., the first end 54 or the second end 56) of the centralizer 50 or other accessory, thereby pressing the centralizer 50 or accessory into the casing 22 or liner string 12. As the pressure within the annular body 70 increases, the force applied by the fingers 102 to the centralizer 50 or accessory exceed a "crush" value of the centralizer 50 or accessory and the casing 22 or liner string 12. As the crush values of centralizer 50 or accessory and the casing 22 or liner string 12 are exceeded, the centralizer 50 or accessory is crimped and secured to the casing 22 or liner string 12.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

The invention claimed is:

1. A crimper for crimping an oilfield accessory to an oilfield tubular, comprising:
   a ring-shaped body comprising a cavity; and
   a bladder assembly disposed within the cavity, wherein the bladder assembly comprises an elastic bladder and a plurality of fingers arrayed about opposite ends of the elastic bladder, wherein the ring-shaped body and the bladder assembly are configured to be disposed about the oilfield tubular and pressurized to crimp the oilfield accessory to the oilfield tubular.

2. The crimper of claim 1, wherein the ring-shaped body comprises end caps removably coupled to the ring-shaped body, wherein each of the end caps comprises inner surfaces configured to engage with the plurality of fingers.

3. The crimper of claim 2, wherein the inner surfaces have a curved profile, and each of the plurality of fingers has a curved profile.

4. The crimper of claim 1, wherein the plurality of fingers are cast into the elastic bladder.

5. The crimper of claim 1, wherein the ring-shaped body comprises a port configured to flow a fluid into the cavity.

6. The crimper of claim 5, comprising a hydraulic power pack configured to supply the fluid, wherein the fluid is a hydraulic fluid or oil.

7. The crimper of claim 1, wherein the elastic bladder comprises a rubber.

8. The crimper of claim 1, wherein the elastic bladder comprises a plurality of lips configured to engage with an inner surface of the ring-shaped body to form a plurality of seals.

9. The crimper of claim 1, wherein the plurality of fingers comprises a metal.

10. A system for crimping an oilfield accessory to an oilfield tubular, comprising:
    a cylindrical body, comprising:
    a cavity;
    a port extending from an exterior of the cylindrical body to the cavity; and
    end caps removably coupled to opposite ends of the cylindrical body; and a bladder assembly disposed within the cavity of the cylindrical body, comprising:
  a cylindrical bladder;
  a first plurality of fingers arrayed about a first end of the cylindrical bladder; and
  a second plurality of fingers arrayed about a second end of the cylindrical bladder, wherein the cylindrical body and the bladder assembly are configured to be disposed about the oilfield tubular, and the bladder assembly is configured to abut the oilfield tubular upon pressurization to crimp the oilfield accessory to the oilfield tubular.

11. The system of claim 10, wherein the first and second pluralities of fingers are cast into the cylindrical bladder.

12. The system of claim 11, wherein the cylindrical bladder comprises a rubber, and the first and second pluralities of fingers comprise steel.

13. The system of claim 10, wherein the cylindrical bladder comprises a plurality of protrusions configured to contact an inner surface of the cylindrical body, wherein the plurality of protrusions are configured to create a plurality of pressure seals within the cavity.

14. The system of claim 10, comprising a hydraulic pump configured to flow a fluid into the cavity through the port.

15. The system of claim 14, wherein the fluid is a hydraulic fluid or oil.

16. The system of claim 10, wherein each of the end caps comprises a curved inner surface, and each the first and second pluralities of fingers comprises a distal end having a curved profile, wherein each of the distal ends of the first or second pluralities of fingers is configured to engage with the curved inner surface of one of the end caps.

17. The system of claim 10, wherein the oilfield accessory is a casing accessory and wherein the oilfield tubular is a casing, and wherein the casing accessory is disposed about the casing.

18. A method for crimping an oilfield tubular accessory to an oilfield tubular, comprising:
  positioning a crimper about the oilfield tubular accessory to be secured to the oilfield tubular;
  pumping a fluid in a cavity of a crimper body;
  applying a radially inward force to the oilfield tubular accessory with a plurality of fingers of a bladder assembly disposed within the cavity of the crimper body, said force crimping the oilfield accessory to the oilfield tubular;
  draining the fluid from the cavity; and
  removing the crimper from the oilfield tubular accessory.

19. The method of claim 18, wherein applying the radially inward force to the oilfield tubular accessory with the plurality of fingers of the bladder assembly disposed within the cavity of the crimper body comprises expanding an elastic portion of the bladder assembly coupled to the plurality of fingers in an axial direction and directing the plurality of fingers radially inward with end caps of the crimper body.

20. The method of claim 18, wherein pumping the fluid in the cavity of the crimper body comprises pumping a hydraulic fluid or oil through a port of the crimper body with a hydraulic power pack.

* * * * *